April 1, 1958 H. J. KOCHEVAR 2,829,305
ELECTRONIC SWITCH INCORPORATED IN A DEFLECTION CIRCUIT
Filed Aug. 27, 1954
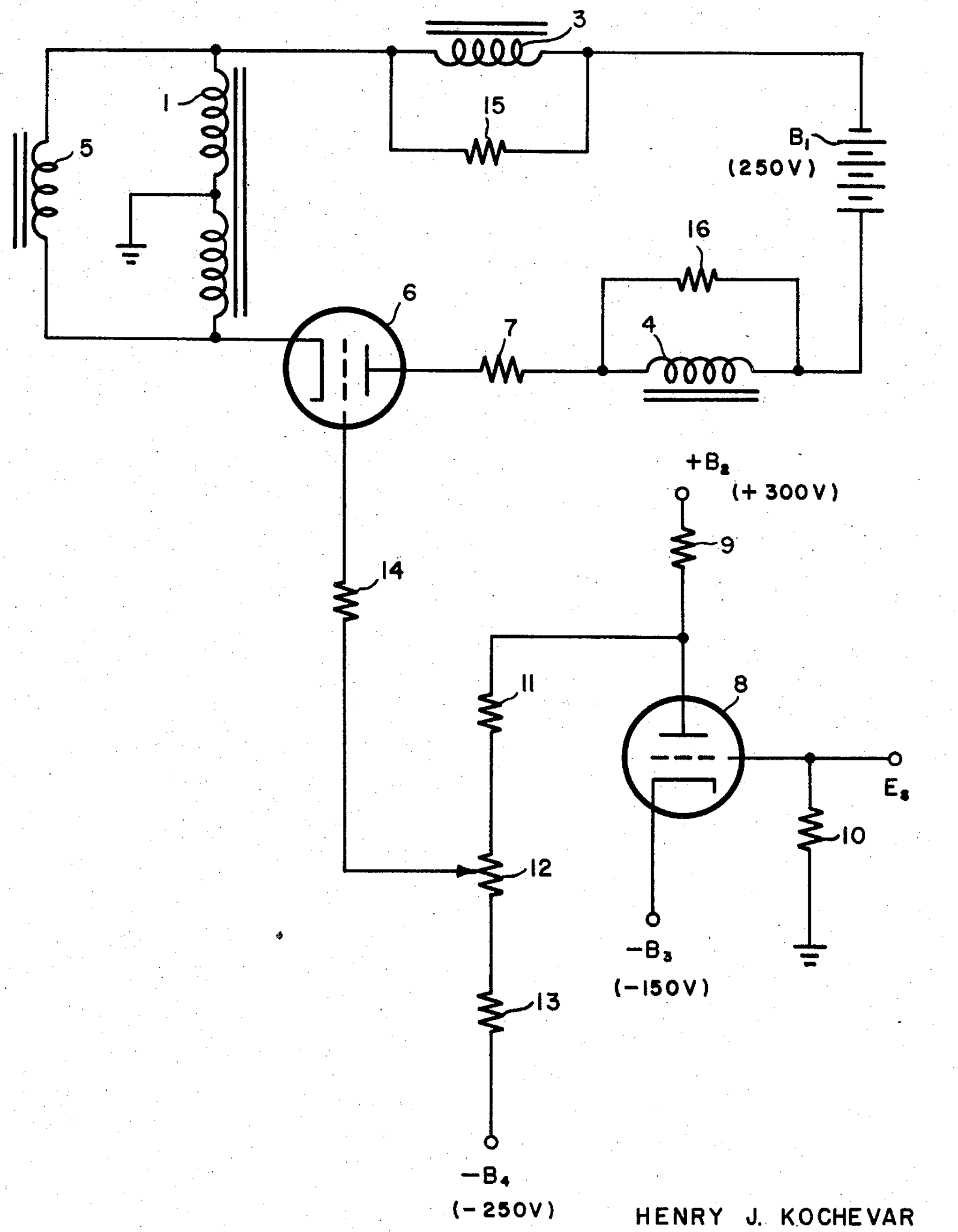
HENRY J. KOCHEVAR
*INVENTOR.*
*BY*
Killman and Kerst
*ATTORNEYS*

United States Patent Office 2,829,305

Patented Apr. 1, 1958

2,829,305

ELECTRONIC SWITCH INCORPORATED IN A DEFLECTION CIRCUIT

Henry J. Kochevar, Baltimore, Md., assignor to Bendix Aviation Corporation, Towson, Md., a corporation of Delaware Application August 27, 1954, Serial No. 452,513

6 Claims. (Cl. 315—27)

This invention relates to an improvement in electronic switches which is particularly useful in systems requiring the electronic switching of the origin of a sweep voltage waveform between two values, for the presentation of two displays on the face of a cathode ray tube utilizing magnetic deflection means.

It has been the general practice in the art, where it was desired to generate more than one simultaneously visible display at spaced locations on a cathode ray tube face, to place the magnetic deflection coil of the cathode ray tube in the plate circuit of the deflection amplifier, in which arrangement switching voltage is applied as the output of a tube in parallel with the deflection amplifier. It is sometimes advantageous, however, to include the deflection coil in a transformer coupled sweep circuit. In such an arrangement the application of switching voltage in the above described manner is not satisfactory since the low impedance and capacity to ground of the switch tube reacts upon the sweep circuit to introduce distortion into the output thereof.

It is an object of this invention to provide a deflection circuit incorporating an electronic switch, which circuit can be transformer coupled to a source of sweep voltage without introducing distortion into the output waveform thereof by virtue of a low impedance and capacity to ground of the electronic switch.

It is another object of this invention to provide such a circuit in which the switch, in addition to performing a switching function, provides a means for controlling the magnitude of the displacement between the two displays on the cathode ray tube face.

These and other objects and advantages of the invention are realized in a circuit in which the space discharge path of a switching tube is placed in series with a deflection coil having its center-tap grounded and with a floating power supply, in a transformer coupled sweep circuit. The switching action of the switching tube is controlled through the control grid of that tube by means of a control tube to which is applied a switching voltage to render it either conductive or non-conductive. The output of this tube is coupled to the control grid of the switch tube by way of a voltage divider incorporating a potentiometer, by means of which the magnitude of the displacement of the two displays can be regulated.

The single figure of the drawing is a schematic diagram of a circuit embodying the invention.

Referring now more particularly to the drawing, there is shown a magnetic deflection circuit including the deflection coil 1 having its center-tap connected to ground and a power supply $B_1$ in series therewith. The power supply $B_1$ furnishes the current for displacing the sweep. Two isolating chokes 3 and 4 are provided in this series circuit, each choke being connected between a respective terminal of the power supply and the deflection coil. Connected across the coil 1 is a secondary 5 of a transformer which couples the sweep voltage to the circuit.

Connected between the isolating coil 4 and the deflection coil is a switch tube 6. The anode of this tube is connected to the coil 4 by way of a load resistor 7, while the cathode is connected to the deflection coil 1. Associated with the switch tube 6 is a control tube 8 having its anode connected to the positive terminal of a power supply $B_2$ by way of a load resistor 9 and its cathode connected to the negative terminal of a power supply $B_3$. The control grid of the tube 8 is connected to a source of signal voltage $E_s$ and to ground by way of a resistor 10. The anode of the tube 8 is connected to the negative terminal of the source $B_4$ by way of a voltage divider comprising resistors 11, 12 and 13. The resistor 12 is connected by way of a potentiometer connection and a resistor 14 to the control grid of the tube 6. The isolating chokes 3 and 4 are shunted by resistors 15 and 16.

The function of the circuit described above is to electronically switch a sweep on a cathode ray tube display from one position to another in order to simultaneously present two displays on the tube face. It will be noted that the power supply $B_1$ is floating. In order to change the location of the sweep on the tube face it is necessary to pass a D. C. current from the power supply $B_1$ through the deflection coil 1. The chokes 3 and 4 serve to isolate the shunting effect of the low impedance of the power supply $B_1$ from the deflection coil. The control tube 6 serves to regulate the amount of current passing through the deflection coil and this control is determined by the bias on the tube.

This bias is supplied by way of the voltage divider consisting of the resistors 11, 12 and 13 connected between the anode of the tube 8 and the negative terminal of $B_4$. Control of the bias voltage supplied by this voltage divider is effected by the tube 8. The tube 8 is alternated between two conditions, in one of which it conducts and in the other of which it is cut off. The switching voltage $E_s$ should be zero volts for the first condition of the tube and should have a negative value sufficiently larger than $-B_3$ to cut off the tube 8 for the other condition. When $E_s$ has a value of zero the tube 8 will draw grid current which is limited by the high valued resistor 10. Under this condition the tube 8 will draw a heavy plate current resulting in a low plate voltage. With this low value of plate voltage the range of negative bias voltage that the potentiometer 12 can provide will extend from a value permitting conduction of tube 6 to a value beyond the cut-off of that tube. When the value of $E_s$ switches to its negative value which effects the cut-off of tube 8, the plate voltage will rise to a high value. This will shift the range of bias voltage spanned by potentiometer 12 to a reduced negative level. The range of bias which can now be obtained extends from a small positive value to some negative conducting value for tube 6. If a bias of zero volts is required for tube 6, the grid current is limited by a high resistance 14.

The frequency of switching will lie in the audio range. The recovery time of the displacement current will depend on the inductance of isolating chokes 3 and 4. The transients developed from these chokes are reduced by the damping resistors 15 and 16.

What is claimed is:

1. A deflection circuit for repetitively sweeping the beam of a cathode ray tube from two points of origin, in alternation, comprising: a magnetic deflection coil, transformer coupling means applying a sawtooth voltage across said deflection coil, means forming a series circuit with said deflection coil, the last named means comprising a D. C. source and a space discharge tube connected with its space discharge path forming a portion of said series circuit, a control grid in said space discharge tube, a source of voltage having a square waveform, and means applying voltage from the last named source to said control grid.

2. A deflection circuit for repetitively sweeping the beam of a cathode ray tube from two points of origin, in alternation, comprising: a magnetic deflection coil, transformer coupling means applying a sawtooth voltage across said deflection coil, means forming a series circuit with said deflection coil, the last named means comprising a D. C. source and a space discharge tube connected with its space discharge path forming a portion of said series circuit, a control grid in said space discharge tube, a source of voltage having a square waveform, means to shift the range of the excursions of said square waveform, and means applying voltage from the last named source to said control grid.

3. A deflection circuit for repetitively sweeping the beam of a cathode ray tube comprising: a magnetic deflection coil, transformer coupling means applying a sawtooth voltage across said deflection coil, means forming a series circuit with said deflection coil, the last named means comprising a D. C. source and a space discharge tube connected with its space discharge path forming a portion of said series circuit, a control grid in said space discharge tube, a control tube, a voltage divider connected between the output of said control tube and a source of negative potential, means connecting the output of said voltage divider to said control grid, and means alternating the conductivity of said control tube between two levels.

4. A deflection circuit as claimed in claim 3, said voltage divider including means for shifting the range of the output thereof.

5. A deflection circuit for repetitively sweeping the beam of a cathode ray tube from two points of origin, in alternation, comprising: a magnetic deflection coil; transformer coupling means applying a sawtooth voltage across said deflection coil; means forming a series circuit with said deflection coil, the last named means comprising a D. C. source, a space discharge tube connected with its space discharge path forming a portion of said series circuit, and a pair of isolating coils, each interposed between a respective terminal of said deflection coil and said D. C. source; and means alternating said space discharge tube between conductive and non-conductive states.

6. A deflection circuit for repetitively sweeping the beam of a cathode ray tube comprising: a magnetic deflection coil; transformer coupling means applying a sawtooth voltage across said deflection coil; means forming a series circuit with said deflection coil, the last named means comprising a D. C. source, a space discharge tube connected with its space discharge path forming a portion of said series circuit, and a pair of isolating coils, each interposed between a respective terminal of said deflection coil and said D. C. source; a control grid in said space discharge tube; a control tube; a voltage divider connected between the output of said control tube and a source of negative potential; means for shifting the range of the output of said voltage divider; means coupling the output of said voltage divider to said control grid; and means alternating the conductivity of said control tube between two levels.

References Cited in the file of this patent

UNITED STATES PATENTS

| | | |
|---|---|---|
| 2,305,919 | Eaton | Dec. 22, 1942 |
| 2,373,748 | Eaton | Apr. 17, 1945 |
| 2,382,822 | Schade | Aug. 14, 1945 |
| 2,622,228 | Jones | Dec. 16, 1952 |